United States Patent
Wu

(10) Patent No.: US 6,202,695 B1
(45) Date of Patent: Mar. 20, 2001

(54) WATER FAUCET CONTROL CARTRIDGE

(76) Inventor: Faucet Wu, No.40,326 Lane, Chang Ding Road, Lu Kang Chen, Chang Hua Hsien (TW)

( * ) Notice: Subject to any disclaimer, the term of this patent is extended or adjusted under 35 U.S.C. 154(b) by 0 days.

(21) Appl. No.: 09/288,956

(22) Filed: Apr. 9, 1999

(51) Int. Cl.[7] .................................................. F16K 5/12
(52) U.S. Cl. ..................... 137/625.3; 137/454.6; 137/625.31
(58) Field of Search ..................... 137/625.31, 625.3, 137/454.6; 251/208

(56) References Cited

U.S. PATENT DOCUMENTS

| | | | |
|---|---|---|---|
| 4,700,928 | * 10/1987 | Marty | 251/310 |
| 5,107,884 | * 4/1992 | Orlandi | 137/454.5 |
| 5,348,042 | * 9/1994 | Wagner et al. | 137/625.31 X |
| 5,732,734 | * 3/1998 | Buccicone | 137/454.6 |

* cited by examiner

*Primary Examiner*—Stephen Hepperle
(74) *Attorney, Agent, or Firm*—Bacon & Thomas

(57) ABSTRACT

An improved structure for a water faucet control cartridge including an eccentrically arranged valve at the lower extent of the flow guide disk. The eccentrically arranged valve is of plastic construction and has an internal offset flow passage that enables water to flow from the water output seat of the faucet to the flow guide disk. The valve has a flat, semicircular, top surface for sealing against the flow disk.

7 Claims, 4 Drawing Sheets

WATER FAUCET CONTROL CARTRIDGE

BACKGROUND OF THE INVENTION

1) Field of the Invention

The invention herein relates to an improved structure for a water faucet control cartridge comprised of a cartridge body, a sealing disk, a flow guide disk, and an eccentrically arranged valve. The eccentrically arranged valve is of plastic construction and, furthermore, has an internal offset flow passage which is contiguous with the opening of the faucet water supply pipe. This innovation allows a conventional water control cartridge to be replaced with a water control cartridge equipped with an eccentrically arranged valve so that the water flows through the offset flow passage directly from the water supply pipe seat, continues pass the flow guide disk and the water outlet hole of the cartridge body, and finally emerges from the mouth of the faucet. The improved structure of water faucet control cartridge is easy to install and offers excellent practicality.

2) Description of the Prior Art

Referring to FIG. 1. a conventional water faucet control cartridge is comprised of a cartridge body 2 installed at the lower extent of the faucet handle 11 (see FIG. 4). The cartridge body 2 has a rotary control stem 21 in the center; a water outlet hole 22 at the bottom end and a water control piece 6 having a water inlet hole 61 that is fitted to the bottom end of the cartridge body 2 with a pipe end washer 121 for the faucet water output seat 12 (see FIG. 3). Furthermore there is a coil spring 122 compressed under the bottom end of the pipe end washer 121 so that when the user opens the faucet, the handle 11 rotates the cartridge body 2 as well as the water control piece 6 fitted to the bottom end of the cartridge body 2 as a single structural entity, causing the water inlet hole 61 of the water control piece 6 to become aligned with the hole center of the pipe end washer 121, thereby allowing water to flow from the water output seat 12 of the faucet 11. However, in actual application, the structure is has a number of shortcomings requiring improvement that are summarized below.

1. Short Service Life

In a conventional water faucet control cartridge, the water control piece 6 is directly compressed on the pipe end washer 121 of the water output seat 12 such that when the faucet is opened, the cartridge body 2 rotates the water control piece 6. Friction is therefore generated between the outer edge of the water inlet hole 61 and the surface of the pipe end washer 121, resulting in damaging wear to the pipe end washer 121 and eventually leading to water leakage from the deteriorated pipe end washer 121 which precludes further utilization. Furthermore since the water control cartridge readily malfunctions, the service life is shortened, resulting in an accelerated rate of replacement.

2. Troublesome Installation

In a conventional water faucet control cartridge, the pipe end washer 121 is tightly secured onto the water output seat 12 and cannot be further utilized when the pipe end washer 121 begins to leak from areas that are deteriorated from surface wear. Consequently the entire water output seat 12, must be replaced which is not only a troublesome installation procedure, but also requires the user to purchase a new water output seat 12, thereby increasing user utilization cost.

In view of the said shortcomings, the industry researched and developed a water control cartridge that did net wear down the pipe end washer 121 of the water output seat. Furthermore, the cartridge body was additionally equipped with a sealing disk 3 and a flow guide disk 4 fabricated of a precision ceramic. Since the precision ceramic was a wear-resistant material and capable of withstanding up to 50,000 rotations, the sealing disk 3 and the flow guide disk 4 could be utilized for an extended period of time. Furthermore, since the rotary control stem rotated the sealing disk 3, the pipe end washer 121 was no longer subjected to long-term friction with the water control piece 6 as in a conventional water control cartridge. The more recently developed water control cartridge seldom malfunctioned and had an extended service life.

However, most water control cartridges equipped with precision ceramic components that available on the market are structures having a water outlet hole situated at the center and lower part of the cartridge. Therefore, they cannot be utilized on conventional water output seats because conventional water control faucet cartridges have matching water output seats and the water outlet hole of the water output seat designed in an eccentric or offset structural configuration. They and require a replacement water output seat with the water output opening at the center and aligned with the flow guide hole in the center of the flow guide disk, which is inconvenient for the user. In view of the existent disadvantages, the inventor of the invention herein conducted extensive research, testing, and refinement which finally culminated in the successful development of the improved structure faucet water control cartridge of the invention herein, which is an original and innovative product that eliminates many of the said shortcomings and disadvantages and features significantly enhanced functional performance.

BRIEF SUMMARY OF THE INVENTION

The primary objective of the invention herein is provide an improved structure for a water faucet control cartridge of excellent practicality and which is, easily installed. The invention herein has a eccentrically arranged valve at the lower extent of the flow guide disk. The eccentrically arranged valve is of plastic construction and has an internal offset flow passage that enables water to flow from the water output seat of the faucet to the flow guide disk. The precision ceramic component water control cartridge can be utilized on conventional end pipe washers of offset configuration water faucet output seats, without requiring a water output seat replacement. The invention thereby offers outstanding practicality and, furthermore, lessens user installation difficulties.

To enable the examination to further understand the structure, innovations, functions, and other practical objectives of the invention herein, the brief description of the drawings below are followed by the detailed description of the invention.

DETAILED DESCRIPTION OF THE INVENTION

Figure 1:
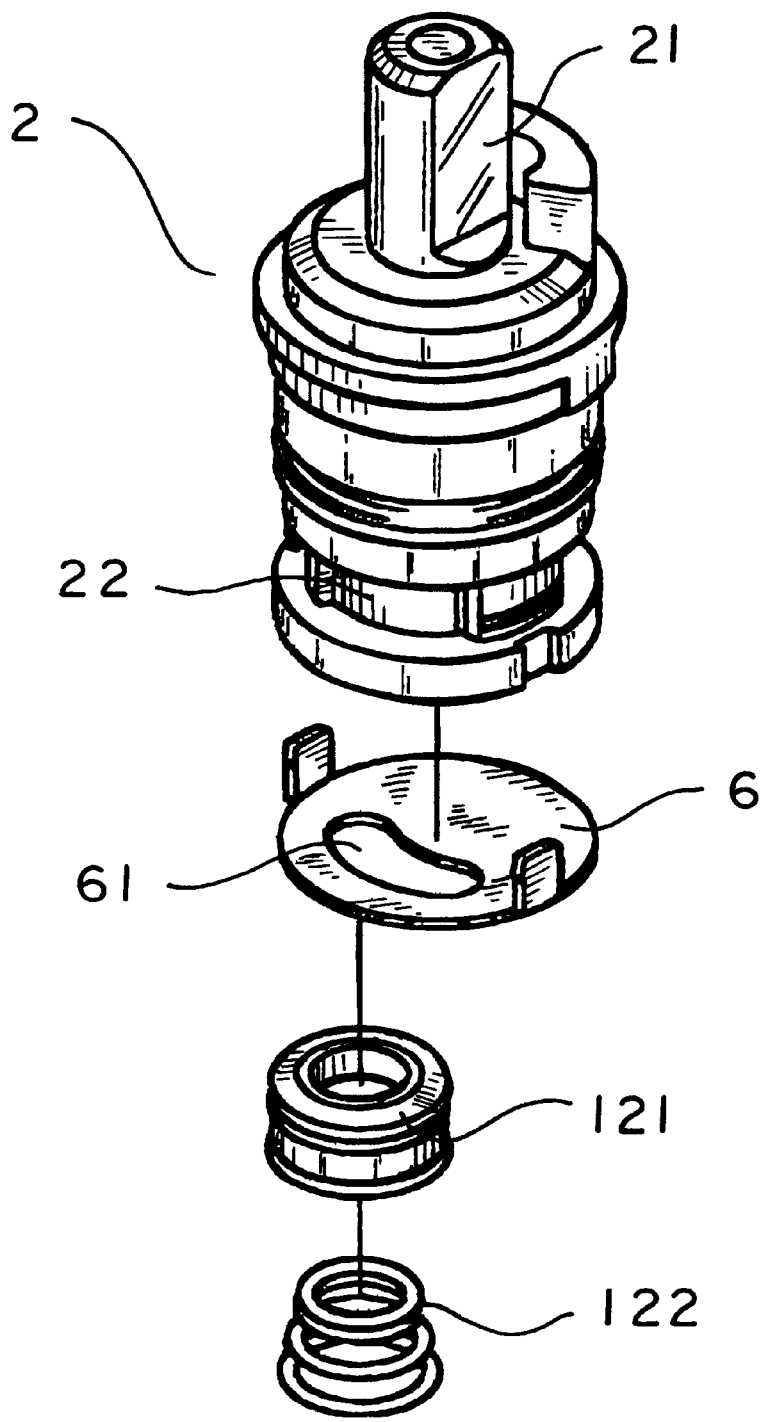
FIG. 1 is an exploded isometric drawing of a conventional water control cartridge.
Figures 2, 2A:
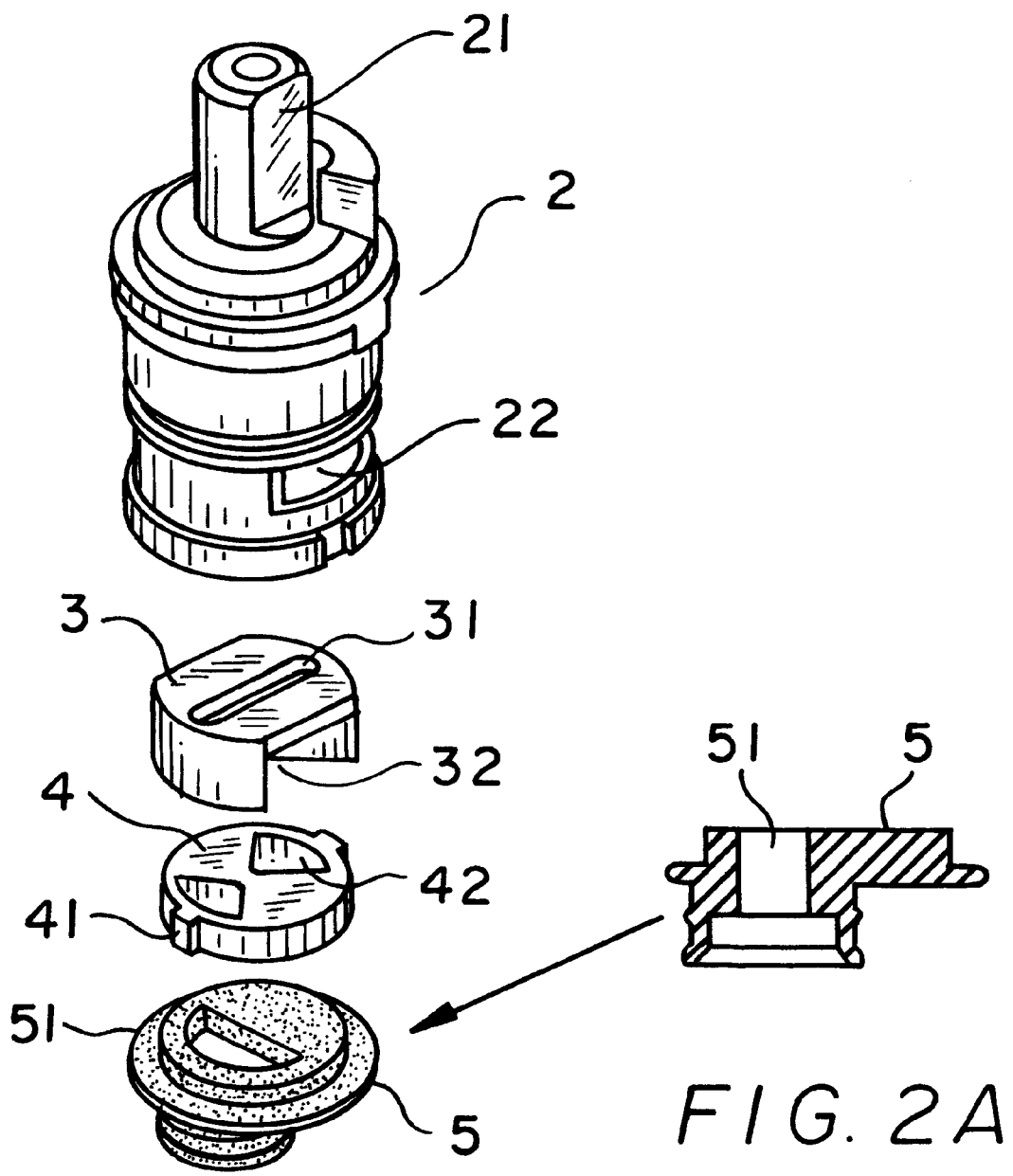
FIG. 2 is an exploded isometric drawing of the water control cartridge of the invention herein.
FIG. 2A is a sectional view of one of the eccentrically arranged valve 5 shown in FIG. 2.
Figures 3A, 3B:
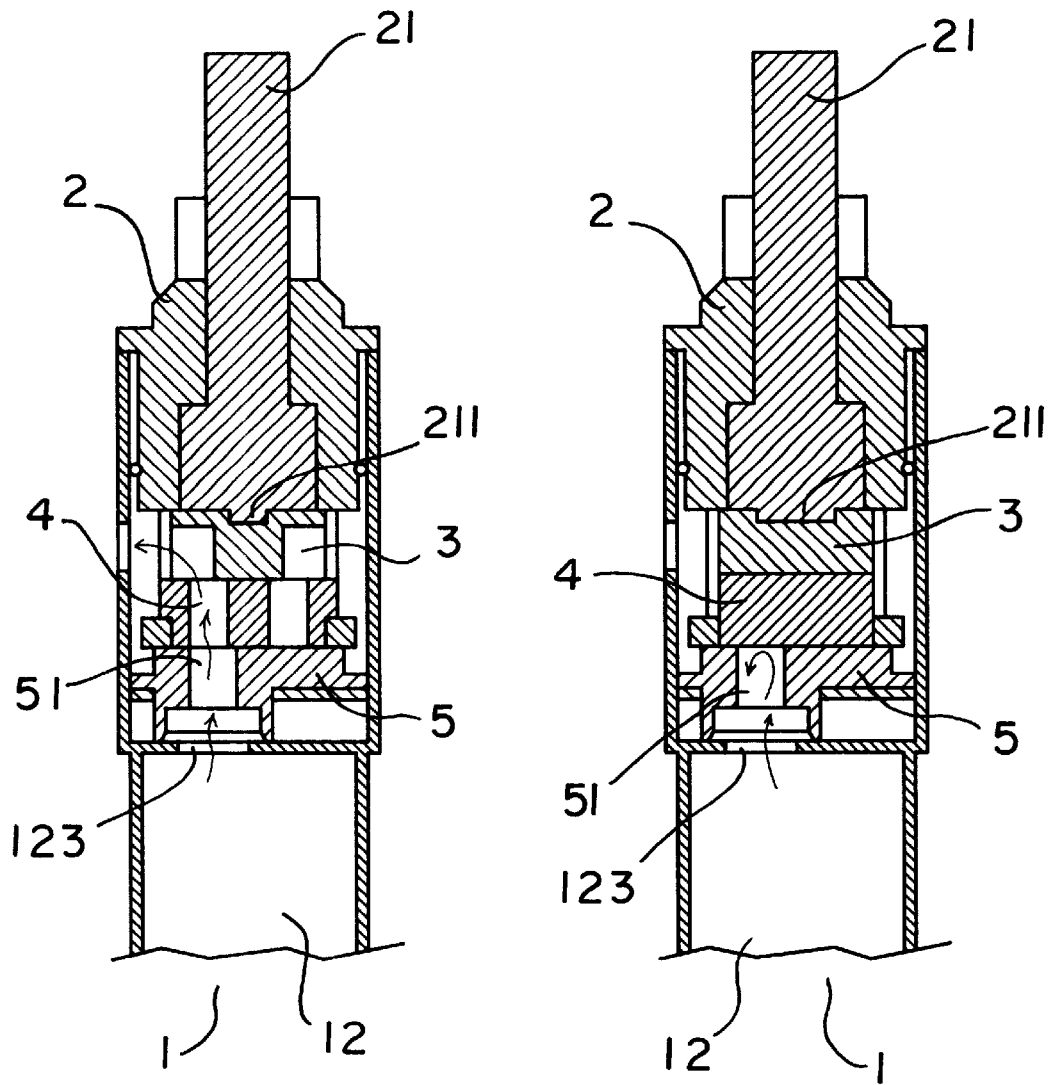
FIG. 3A is a cross-sectional drawing of the invention herein when the faucet is closed.
FIG. 3B is a cross-sectional drawing of the invention herein when the faucet is opened.

Referring to FIGS. 2, 2A, 3A and 3B as indicated in the structural drawings, the invention herein is comprised of a rotary control stem 21 that is situated at the center of the cartridge body 2 and installed below the handle 11 (see FIG. 4) of a water faucet 1. A sealing disk 3 is fitted to the bottom end of the rotary control stem 21 and, is capable of rotating synchronously with the rotary control stem 21. A flow guide disk 4 that is positioned under the sealing disk 3 and, furthermore, has an outer circumference that fits into the water output seat 12 of the water faucet 1. An eccentrically arranged valve 5 that is capable of varying the water flow path is assembled to the bottom end of the flow guide disk 4.

The cartridge body 2 is a cylindrical structure having a steplike profile and, furthermore, a water outlet hole 22 through the circumferential edge at the bottom end. The sealing disk 3 is mounted on the tang 211 at the bottom end of the rotary control stem 21 situated through the center of the cartridge body 2.

The sealing disk 3 is a circular structure of ceramic construction and the circular surface of the sealing disk 3 is contiguous with the water outlet edge 32 of the water outlet hole 22. There is a fastening slot 31 in the top end of the sealing disk 3 and, furthermore, the fastening slot 31 is arranged over the tang 211 at the bottom end of the rotary control stem 21 such that when the rotary control stem 21 is rotated, the sealing disk 3 rotates simultaneously.

The flow guide disk 4 is a circular structure having a locking tab 41 on its circular surface and a flow guide hole 42 on each the two sides.

The eccentrically arranged valve 5 is of plastic construction and has an internal offset flow passage 51. The upper extent of the offset flow passage 51 is contiguous with the flow guide hole 42 of the flow guide disk 4 and the lower extent of the offset flow passage 51 is contiguous with the washer 121 (see FIG. 1) of the faucet water supply pipe seat 1.

The operation of the invention herein is as follows: when the user rotates the handle 11, the rotary control stem 21 is driven into rotation along with the sealing disk 3 which then causes the water outlet hole 22 and the water outlet edge 32 of the sealing disk 3 at the bottom end of the cartridge body 2 to become aligned. This causes the alignment of the water outlet edge 32 of the sealing disk 3 with the flow guide hole 42, thereby allowing water to flow from the output opening 123 of the water supply pipe seat 1 through the eccentrically arranged valve 5 and the sealing disk 3. The water then flows through and emerges from the water outlet hole 22 of the cartridge body 2. As such, the invention herein is of excellent practicality and, furthermore, is an improved structure faucet water control cartridge that is easy to install.

Figure 4:
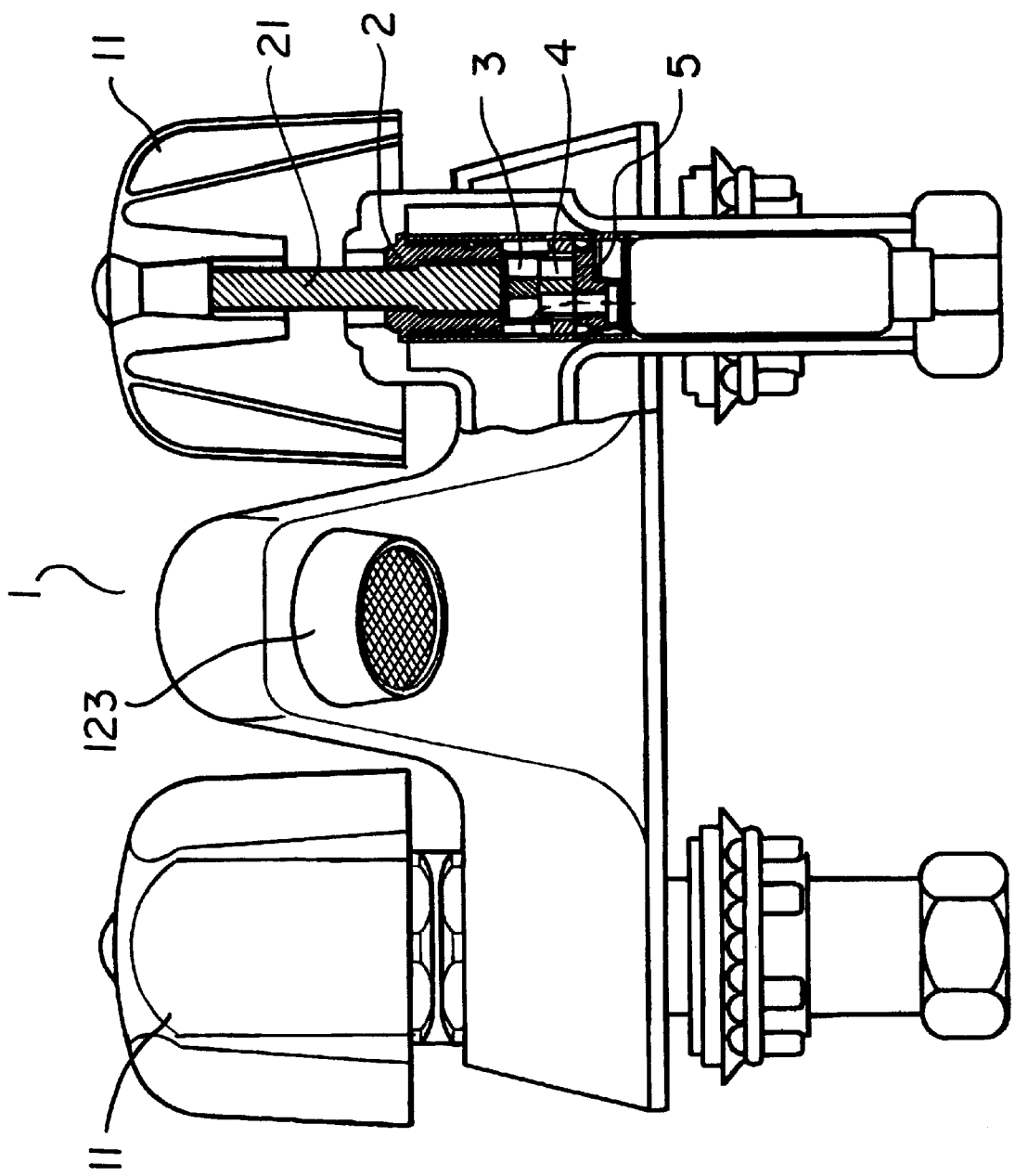
FIG. 4 is a schematic cross-sectional drawing of the double-handle water control cartridge of the invention herein.

Referring to FIG. 4 showing a double-handle water control cartridge embodiment of the invention herein, since there are water control cartridge structures at the two water output ends of the faucet, after the faucet is opened, water flows through the eccentrically arranged valves 5 in the cartridge bodies 2 and emerges from the water outlet hole 22 at the sides of the cartridge bodies 2. The flow from the two water control cartridges then converges from the water outlet end 124 at the center of the faucet.

In summation of the foregoing section, since the improved structure faucet water control cartridge of the invention herein is capable of achieving all claimed objectives and, furthermore, features enhanced product practicality, the invention herein complies with new patent requirements and is hereby submitted in application for the commensurate patent rights.

What is claimed is:

1. An improved water faucet control cartridge comprising;
   a rotary control stem that is situated at the center of a cartridge body and installed below the handle of a water faucet;
   a sealing disk that is fitted to the bottom end of the rotary control stem and for rotating synchronously with the rotary control stem;
   a flow guide disk that is positioned under the sealing disk and has an outer circumference that fits into a water output seat of the water faucet;
   an eccentrically arranged valve for varying the water flow path assembled to the bottom end of the said flow guide disk, said valve having a flat, substantially semicircular, top surface for sealing against a portion of a bottom surface of the flow guide disk;
   the eccentrically arranged valve having a plastic construction an internal offset flow passage, wherein an upper extent of the said offset flow passage is contiguous with a flow guide hole in the flow guide disk and a lower extent of the offset flow passage is continuous with a washer in the faucet water supply pipe seat; and
   whereby when the user rotates the handle, the rotary control stem is driven into rotation along with the sealing disk causing the water outlet hole and the water outlet edge of the sealing disk at the bottom end of the cartridge body to become aligned and also causing the alignment of the water outlet edge of the sealing disk with the flow guide hole, thereby allowing water to flow from the output opening of the water supply pipe seat through the eccentrically arranged valve and the sealing disk, after which the water flows through and emerges from the water outlet hole of the cartridge body.

2. The improved water faucet control cartridge recited in claim 1 wherein said flow guide includes two locking tabs extending outward from opposite edges thereof for engaging with corresponding slots in said water output seat.

3. The improved water faucet control cartridge recited in claim 1 wherein said top surface of the valve further includes a substantially semicircular opening in communication with said offset flow passage.

4. The improved water faucet control cartridge recited in claim 2 wherein said top surface of the valve further includes a substantially semicircular opening in communication with said offset flow passage.

5. The improved water faucet control cartridge recited in claim 4 wherein said control stem includes a single tang for engaging a slot in a top surface of the sealing disk.

6. The improved water faucet control cartridge recited in claim 5 wherein said sealing disk is truncated on opposite side edges.

7. The improved water faucet control cartridge recited in claim 6 wherein said sealing disk and flow guide are formed from a ceramic material.

* * * * *